(12) United States Patent
Leininger et al.

(10) Patent No.: US 9,290,708 B2
(45) Date of Patent: Mar. 22, 2016

(54) GASIFICATION SYSTEM AND METHOD FOR GASIFYING A FUEL

(75) Inventors: Thomas Frederick Leininger, Chino Hills, CA (US); John Saunders Stevenson, Anaheim, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 914 days.

(21) Appl. No.: 13/353,153

(22) Filed: Jan. 18, 2012

(65) Prior Publication Data

US 2013/0180175 A1 Jul. 18, 2013

(51) Int. Cl.
| | | |
|---|---|---|
| *B01J 7/00* | (2006.01) | |
| *C10J 3/50* | (2006.01) | |
| *C10J 3/72* | (2006.01) | |
| *C10K 1/00* | (2006.01) | |
| *C10K 1/10* | (2006.01) | |
| *C10K 3/04* | (2006.01) | |

(52) U.S. Cl.
CPC *C10J 3/506* (2013.01); *C10J 3/721* (2013.01); *C10J 3/723* (2013.01); *C10J 3/726* (2013.01); *C10K 1/003* (2013.01); *C10J 2200/152* (2013.01); *C10J 2300/1653* (2013.01); *C10K 1/10* (2013.01); *C10K 3/04* (2013.01); *Y02E 20/16* (2013.01); *Y02E 20/18* (2013.01)

(58) Field of Classification Search
CPC .............. C10J 2300/0959; C10J 3/723; C10J 2300/0956; C10J 2300/1846; C10J 2200/152
See application file for complete search history.

(56) References Cited

U.S. PATENT DOCUMENTS

| | | | |
|---|---|---|---|
| 4,385,906 A | | 5/1983 | Estabrook |
| 4,391,611 A | * | 7/1983 | Haldipur ................ B01J 8/1827 422/145 |
| 4,392,869 A | | 7/1983 | Marion et al. |
| 4,394,137 A | | 7/1983 | Marion et al. |
| 4,400,179 A | | 8/1983 | Marion et al. |
| 4,443,228 A | | 4/1984 | Schlinger |
| 4,490,156 A | | 12/1984 | Marion et al. |
| 4,491,456 A | | 1/1985 | Schlinger |
| 4,493,636 A | * | 1/1985 | Haldipur ................ B01J 8/1827 110/245 |
| 5,087,271 A | | 2/1992 | Stellaccio et al. |
| 5,515,794 A | | 5/1996 | Kassman et al. |
| 2008/0000404 A1 | | 1/2008 | Fischer et al. |
| 2009/0029299 A1 | | 1/2009 | Fischer et al. |
| 2010/0126175 A1 | * | 5/2010 | Kim et al. ........................ 60/742 |
| 2010/0154304 A1 | * | 6/2010 | Tsangaris et al. .................. 48/74 |
| 2011/0162376 A1 | * | 7/2011 | Guo .......................... C10J 3/506 60/746 |
| 2012/0005959 A1 | * | 1/2012 | Chen et al. ........................ 48/61 |
| 2013/0040255 A1 | * | 2/2013 | Shi .......................... F23N 1/002 431/354 |
| 2013/0048085 A1 | * | 2/2013 | Tyree et al. ........................ 137/1 |

* cited by examiner

*Primary Examiner* — Imran Akram
(74) *Attorney, Agent, or Firm* — Fletcher Yoder, P.C.

(57) ABSTRACT

A system includes a gasification feed injector. The gasification feed injector includes a first injector portion configured to inject a first fuel at a first flow rate and a second injector portion configured to inject a second fuel at a second flow rate. The system also includes a fuel circulation system configured to circulate at least one fuel and supply the at least one fuel to the gasification feed injector and a controller configured to transition the gasification feed injector from injecting the first fuel to injecting the second fuel based at least on a pressure downstream of the gasification feed injector.

26 Claims, 7 Drawing Sheets

GASIFICATION SYSTEM AND METHOD FOR GASIFYING A FUEL

BACKGROUND OF THE INVENTION

The subject matter disclosed herein relates to gasification, and, more particularly, to gasification feed injectors.

A variety of combustion systems employ feed injectors to inject a fuel into a combustion chamber. For example, an integrated gasification combined cycle (IGCC) power plant includes a gasifier with one or more feed injectors. The feed injectors supply a fuel, such as an organic feedstock, into the gasifier along with oxygen and steam to generate a syngas. In certain systems, the fuel may be a liquid slurry. When the liquid slurry is not flowing or being used, flow paths containing the liquid slurry may become plugged due to settling or may be susceptible to oxidation and coking. In addition, the feed injectors may be configured to supply the fuel only at normal, or high, flow rates. However, operation of the gasifier at lower fuel flow rates may be advantageous to reduce emissions during startup or standby operations. Unfortunately, existing fuel feed systems and feed injector systems may be inadequate for use with liquid slurry fuels and/or at low fuel flow rates.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification feed injector. The gasification feed injector includes a first injector portion configured to inject a first fuel at a first flow rate and a second injector portion configured to inject a second fuel at a second flow rate. The system also includes a fuel circulation system configured to circulate at least one fuel and supply the at least one fuel to the gasification feed injector and a controller configured to transition the gasification feed injector from injecting the first fuel to injecting the second fuel based at least on a pressure downstream of the gasification feed injector.

In a second embodiment, a system includes a liquid fuel tank configured to store a liquid fuel, a first flow path configured to supply the liquid fuel from the liquid fuel tank at a low flow rate to a low flow rate portion of a gasifier injector, a second flow path configured to supply the liquid fuel from the liquid fuel tank at a high flow rate to a high flow rate portion of the gasifier injector, a cleaning fluid flow path configured to route a cleaning fluid to the first and second flow paths to selectively clean the first and second flow paths, and a purge gas flow path configured to route a purge gas to the first and second flow paths to selectively purge the first and second flow paths.

In a third embodiment, a system includes a control system configured to start up a gasification unit to produce a syngas using a low flow rate portion of an injector to inject a first fuel at a low flow rate into a gasifier of the gasification unit, redirect the syngas to a first unit of the gasification unit when a first pressure of the gasification unit reaches a first threshold, redirect the syngas to a second unit of the gasification unit when a second pressure of the first unit of the gasification unit reaches a second threshold, and start up a high flow rate portion of the injector to inject a second fuel at a high flow rate into the gasifier to increase a flow rate of the syngas after the gasification unit pressure reaches at least one of the first or the second threshold.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments incorporate gasification feed injector with more than one injector portion. For example, the gasification feed injector may include a first injector portion that injects a first fuel at a first flow rate. The gasification feed injector may also include a second injector portion that injects a second fuel at a second flow rate. The first fuel may be different from or the same as the second fuel. The first flow rate may correspond to a low, or startup, flow rate and the second flow rate may correspond to a high, or normal operating condition, flow rate. In certain embodiments, the first and second fuels may be different or the same as one another. In addition, by providing a low flow rate injector portion, the gasification feed injector may help an IGCC power plant or other application using syngas to comply with emissions regulations. For example, until the gasifier is at sufficient pressure, it may be necessary to route untreated syngas to a flare where it may be safely combusted. Thus, by operating at very low flow rates during startup, the emissions generated by the IGCC power plant by flaring the untreated syngas may be substantially reduced. Thus, operation of the gasification feed injector using the low flow rate injector portion may enable the IGCC power plant to operate at or below emissions thresholds set by emissions regulations.

In addition to the gasification feed injector with multiple injector portions described above, the IGCC power plant may include a fuel circulation system that circulates a liquid fuel and supplies the liquid fuel to the gasification feed injector. By circulating the liquid fuel, plugging caused by settling of the liquid fuel may be reduced because the liquid fuel is not left stagnant. In addition, the IGCC power plant may include a fuel controller that sends signals to flow control elements to transition the gasification feed injector from injecting the first fuel to injecting the second fuel based at least on a pressure downstream of the gasification feed injector. For example, a downstream process may receive syngas produced by the gasifier only when the gasifier pressure reaches a threshold. This can be particularly important in plants where a gasification train feeds into a common downstream unit and one or more of the other gasification trains feeding into the common downstream unit are operating. Thus, the fuel controller may send signals to the flow control elements to transition from using the first injector portion to using the second injector portion only when the gasifier or first downstream process (e.g., first process downstream of the gasifier) is capable of delivering the syngas to the downstream process and the downstream process is capable to receive the syngas. Consequently, in some embodiments, the fuel controller also may be in communication with one or more of the downstream units, the other gasification trains configured to deliver feed to the downstream units, and a master control system so that appropriate adjustments may be made to the operations. In further embodiments, the fuel circulation system may include flow paths to supply a cleaning fluid (e.g., water) and a purge gas. The cleaning fluid may be used to clean flow paths containing the liquid fuel when not in use. In addition, the purge gas may be used to purge, or remove, the cleaning fluid from the flow paths after the liquid fuel has been removed. Plugging, and oxidation and/or coking of stagnant liquid fuel may be reduced or eliminated by using the fuel circulation system to remove the liquid fuel from the flow paths when not in use.

Figure 1:
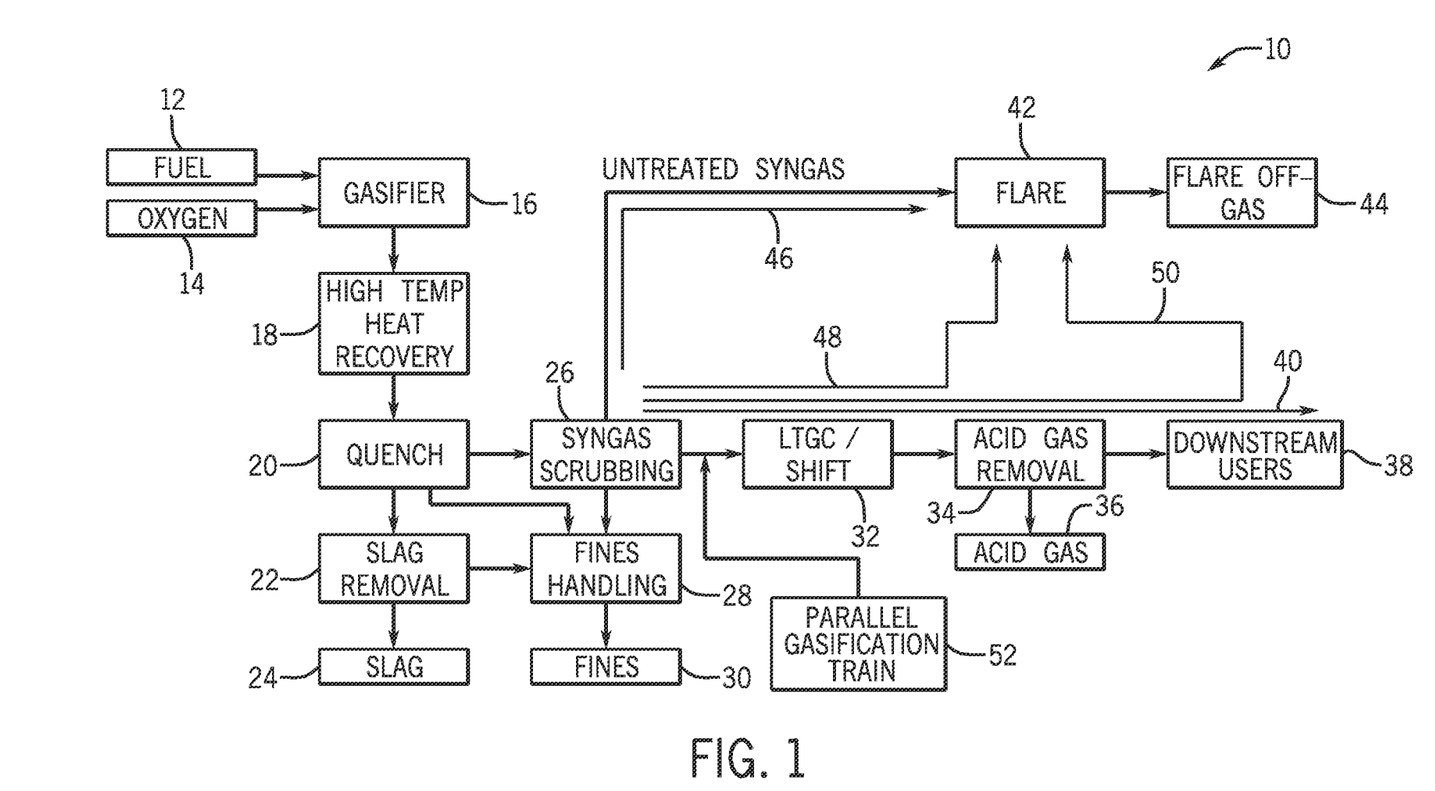
FIG. 1 is a block diagram of a portion of an IGCC power plant incorporating a feed injector according to an embodiment.

Turning now to the drawings, FIG. 1 is a diagram of an embodiment of a portion of an IGCC power plant 10 that may produce and burn a synthetic gas, i.e., syngas. As discussed in detail below, the IGCC power plant 10 may include an embodiment of a gasification feed injector with first and second injector portions, a fuel circulation system, and a fuel controller. The IGCC power plant 10 may include a fuel 12, which may be a liquid or a suspension of solids in the form of a slurry, that may be utilized as a source of energy for the IGCC power plant 10. The fuel 10 may include coal, petroleum coke, oil, biomass, wood based materials, agricultural wastes, tars, asphalt, or other carbon containing materials. The fuel 12 and oxygen 14 may be passed to a gasifier 16. Oxygen 14 may include, but is not limited to, high purity oxygen, air, enriched air, or any other oxygen-containing mixtures. Specifically, the gasifier 16 may include a feed injector to combine the fuel 12 and the oxygen 14 in such a manner as to promote efficient gasification. Thus, the gasifier 16 may convert the fuel 12 into a syngas, e.g., a combination of carbon monoxide and hydrogen. In addition, the gasifier 16 may produce other gases such as, but not limited to, $CO_2$, $H_2O$, $N_2$, Ar, $CH_4$, HCl, HF, COS, $NH_3$, HCN, and $H_2S$. In certain embodiments, the fuel 12 may include a plurality of fuels, such as the first fuel and the second fuel, which may be the same or different from one another.

Next, the syngas and the byproducts from the gasifier 16 may be partially cooled in a high temperature heat recovery system 18. For example, the high temperature heat recovery system 18 may include a heat exchanger in which the hot gases from the gasifier 16 provide heat to generate steam from water. The steam produced by the high temperature heat recovery system 18 may be used elsewhere in the IGCC power plant 10. Next, the cooled gases from the high temperature heat recovery system 18 may be further cooled in a quench system 20. Specifically, the gases from the high temperature heat recovery system 18 may be brought in direct contact with water in the quench system to partially remove unwanted byproducts from the gas. For example, the gasifier 16 may generate slag, which may become a wet ash material following the quench step. Water containing the slag may be transferred from the quench system 20 to a slag removal system 22. The slag removal system 22 may produce slag 24, which may be disposed of or used as road base or as another building material.

Next, the partially scrubbed syngas from the quench system 20 may be sent to a syngas scrubbing system 26 to be further cooled and scrubbed with additional process water. The process water from both the quench system 20 and the syngas scrubbing system 26, as well as the slag water from the slag removal system 22, may accumulate small particles of char and fine ash, referred to as "fines." Thus, the process water from the quench system 20 and syngas scrubbing system 26, and the slag water from the slag removal system 22 may be sent to a fines handling system 28 to remove fines 30. The fines 30 may be recycled to the gasifier or, like the slag 24, may be disposed of or used outside of the IGCC power plant 10. Water from the fines handling system 28 may be recycled to the quench system 20 and/or the syngas scrubbing system 26.

Next, the syngas from the syngas scrubbing system 26 may be sent to a low temperature gas cooling (LTGC)/shift system 32. For example, the LTGC/shift system 32 may include one or more heat exchangers that transfer heat from the syngas to other media, such as boiler feed water from a boiler feed water system, steam condensate, or water. The LTGC/shift system 32 may also include equipment that performs a water gas shift reaction, which includes reacting carbon monoxide with water to produce carbon dioxide and hydrogen. Next, the syngas from the LTGC/shift system 32 may be transferred to an acid gas removal system 34, which may remove one or more acid gases 36 from the syngas. Examples of acid gases 36 include, but are not limited to, hydrogen sulfide, carbonyl sulfide, and carbon dioxide. Finally, treated syngas from the acid gas removal system 34 may be sent to one or more downstream users 38, where it may be used as a fuel, for example, in a gas turbine engine of an IGCC or chemical synthesis plant, such as for the production of ammonia or oxochemicals.

The path of the syngas from the syngas scrubbing system 26 through the LTGC/shift system 32, acid gas removal system 34 and to the downstream users 38 may be referred to as a normal operation flow 40. However, the normal operation flow 40 may not be used during startup and/or standby of the gasifier 16 or IGCC power plant 10. For example, the LTGC/shift system 32 and/or the acid gas removal system 34 may have certain criteria to be met before being started up on or receiving syngas. Thus, untreated syngas from the syngas scrubbing system 26 may be diverted to a flare 42 to be burned and emitted to the atmosphere as a flare off-gas 44. Use of the flare 42 may be minimized to reduce waste of the untreated syngas. Specifically, during startup of the gasifier 16, untreated syngas from the syngas scrubbing system 26 may be routed directly to the flare 42 along a first startup path 46. Once the gasifier 16 and the syngas scrubbing system 26 are at steady-state, or lined out, and at desired pressures, for example, a pressure criterion to receive the untreated syngas in the LTGC/shift system 32 may be met and the untreated syngas diverted from the flare 42 to the LTGC/shift system 32 along a second start-up path 48. Untreated syngas from the LTGC/shift system 32 may then be routed directly to the flare 42 along the second start-up path 48. Once operation of the LTGC/shift system 32 is at steady-state and at a desired pressure, which may correspond to a pressure criterion to receive syngas in the acid gas removal system 34 and/or other downstream users 38, the untreated syngas may be routed to the acid gas removal system 34 and/or downstream users 38 along the normal operation path 40. Alternatively, the treated syngas 38 after treatment in the acid gas removal system 34 may be routed to the flare 42 along a third start-up path 50 until the treated syngas 38 is at steady-state and at a desired pressure, which may correspond to a pressure criterion to receive the treated syngas 38 in the downstream users 38. In further embodiments, each of the successive syngas receiving systems (e.g., LTGC/shift system 32, acid gas removal system 34, and/or downstream users 38) is made operational prior to or coincident with startup of the IGCC power plant 10 and the startup rates maintained sufficiently low such that the successive syngas receiving systems may each readily receive the syngas flow when the associated receiving criteria are met without the need to flare. For example, the acid gas removal system 34 may be pre-pressurized with an inert gas and made fully operational before starting and receiving any syngas. Alternatively, one or more parallel gasification trains 52 already may be in operation that share one or more downstream units with the gasifier 16 being started up, for example, one or more of the units downstream of syngas scrubbing 26, including, but not limited to, the LTGC/shift system 32, acid gas removal system 34, or downstream users 38, such that the corresponding downstream units may already be operating. Although shown connecting downstream of syngas scrubbing in FIG. 1, the parallel gasification trains 52 may also connect downstream of the LTGC/shift system 32, acid gas removal system 34, or downstream users 38, for example.

As discussed in detail below, the feed injector of the gasifier 16 may include a low flow rate portion and a high flow rate portion. Accordingly, the low flow rate portion of the feed injector may be used for startup along the first, second, or third startup paths 46, 48, and 50. When the first, second, or third start-up paths 46, 48, and 50 are used, untreated syngas is directed to the flare 42 to be combusted into the flare off-gas 44. Emissions regulations may limit the amounts or flow rates of certain materials in the flare off-gas 44, such as, but not limited to, hydrogen sulfide and carbonyl sulfide. Lower flow rates of the untreated syngas sent to the flare 42 may reduce the flow rates of regulated materials emitted in the flare off-gas 44. Thus, use of the low flow rate portion of the feed injector may facilitate operation of the IGCC power plant 10 at or below emissions thresholds during start-up and/or standby. In further embodiments, the low flow rate portion of the feed injector may be used when untreated syngas is not directed to the flare 42, but instead is contained until a pressure criterion is met within any of the gasifier 16, high temperature heat recovery system 18, quench system 20, syngas scrubbing system 26, LTGC/shift system 32, acid gas removal system 34, or downstream users 38.

Figure 2:
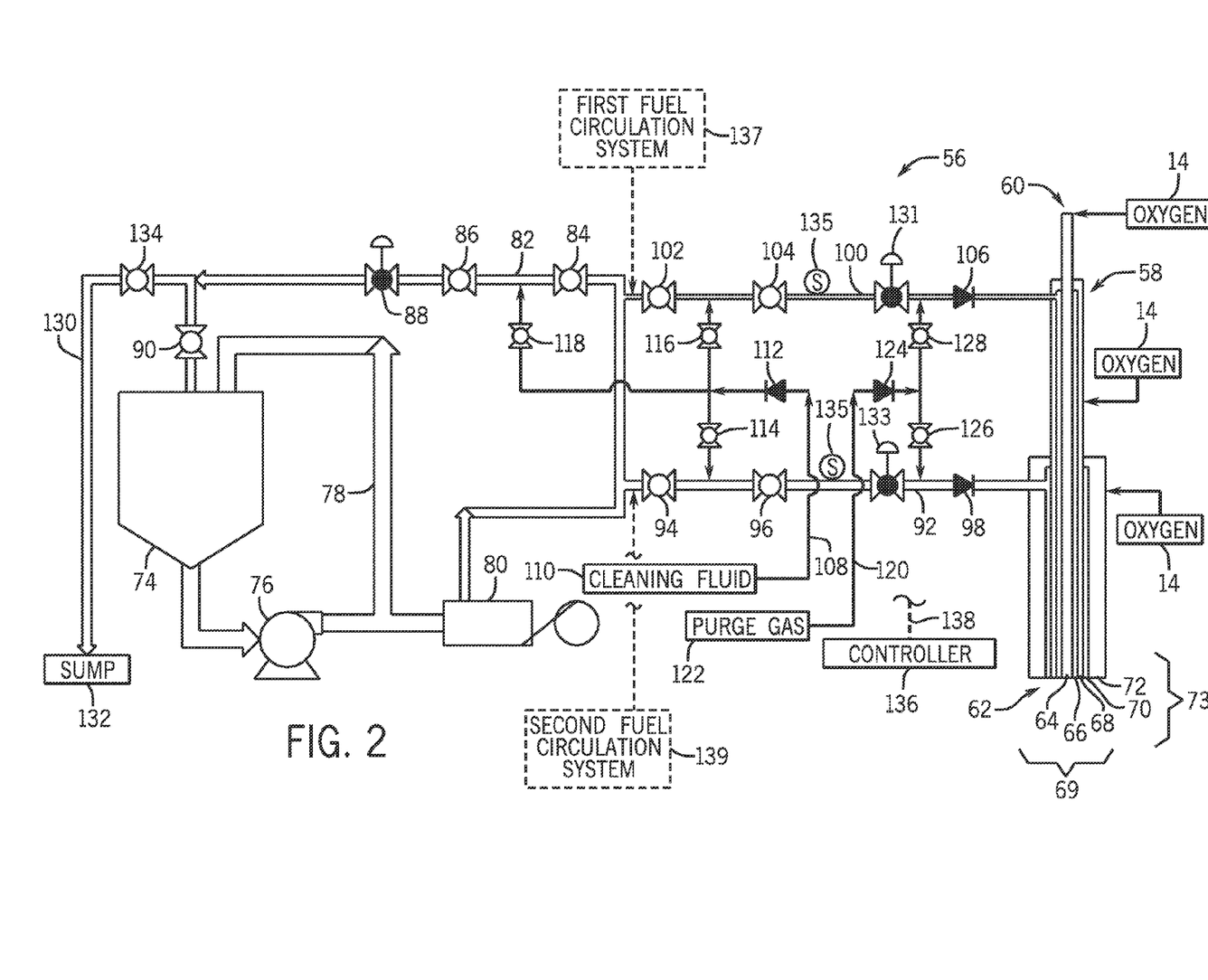
FIG. 2 is a block diagram of a gasification feed injector feed system according to an embodiment.

FIG. 2 is a diagram of a fuel circulation system 56 that may be used with the gasifier 16 of the IGCC power plant 10 described above. Specifically, the fuel circulation system 56 is coupled to a gasification feed injector 58, which may be disposed in the gasifier 16. The gasification feed injector 58 includes an upstream side 60 and a downstream side 62. The downstream side 62 of the feed injector 58 may be exposed to the hot gases generated in the gasifier 16. As shown in FIG. 2, the feed injector 58 includes a plurality of passages (e.g., concentric passages). Specifically, the feed injector 58 may include a first, or central, passage 64, a second passage 66, a third passage 68, a fourth passage 70, and a fifth passage 72, which are arranged concentrically with respect to one another. In certain embodiments, the first passage 64, third passage 68, and fifth passage 72 may route oxygen 14 to the downstream side 62, while the second passage 66 and the fourth passage 70 may route the fuel 12 to the downstream side 62. In other embodiments, the fuel 12 and oxygen 14 may flow though different passages of the feed injector 58. A first, or low flow rate, portion 69 of the feed injector 58 may include the first passage 64, the second passage 66, and the third passage 68, which may be used during startup of the gasifier 16. The fourth passage 70 and the fifth passage 72 define a second, or high flow rate, portion 73 of the feed injector 58, which may be used during normal operation of the feed injector 58.

The first and second portions 69 and 73 of the feed injector 58 shown in FIG. 2 may be configured to operate at a plurality of different rates. For example, in one embodiment, the first portion 69 may be configured to operate at a startup rate and a normal operating rate, which may or may not be the same as the startup rate. Similarly, the second portion 73 may be configured to operate at an initial rate and a normal operating rate, which may or may not be the same as the initial rate. For example, the normal operating rate of the first portion 69 may be between 2% to 50%, 5% to 40%, or 10% to 25% of the normal operating rate of the gasifier 16. The startup rate of the first portion 69 may be between 10% to 110%, 30% to 100%, or 50% to 100% of the normal operating rate of the first portion 69. The initial rate of the second portion 73 may be between 10% to 110%, 30% to 100%, or 50% to 100% of the normal operating rate of the gasifier 16. In addition, during startup of the gasifier 16, the first portion 69 may be operated at the startup rate, followed later by the normal operating rate of the first portion 69. Subsequently, the second portion 73 may be operated at the initial rate, followed later by the normal operating rate of the second portion 73. In certain embodiments, the first portion 69 may continue to be operated at the normal operating rate of the first portion 69 during operation of the second portion 73. In other embodiments, the first portion 69 may be shut off and purged with a purge gas, as described below, during operation of the second portion 73. In further embodiments, the first portion 69 may be operated at the startup rate and the second portion 73 may be operated at the initial rate at the same time during startup of the gasifier 16. In yet further embodiments, both the first and second portions 69 and 73 may be configured to operate at more than just the two rates described above.

The fuel circulation system 56 also includes a fuel storage tank 74. In certain embodiments a fuel circulation pump 76 may be used to circulate the fuel 12 from the fuel storage tank 74 through a low pressure recirculation flow path 78, which returns the fuel 12 to the fuel storage tank 74. In other embodiments, the fuel circulation pump 76 may be omitted. A fuel booster pump 80 may be used to transfer the fuel from the low pressure recirculation flow path 78 to a high pressure recirculation flow path 82, which returns the fuel 12 to the fuel storage tank 74 and supplies the fuel 12 to the feed injector 58. In certain embodiments, the fuel booster pump 80 may be a positive displacement pump. The high pressure recirculation flow path 82 may include a first recirculation block valve 84 and a second recirculation block valve 86. In addition, the high pressure recirculation flow path 82 may include a recirculation backpressure valve 88 and a return valve 90. The function of valves 84, 86, 88, 90 and other valves of the fuel circulation system 56 shown in FIG. 2 are described in more detail below with respect to the cleaning and purging operations associated with the fuel circulation system 56.

As shown in FIG. 2, connected to the high pressure recirculation flow path 82 is a first, or low flow rate, flow path 100, which is coupled to the first portion 69 of the feed injector 58. The first flow path 100 includes a first block valve 102, a second block valve 104, and a check valve 106. Also coupled to the high pressure recirculation flow path 82 is a second, or high flow rate, flow path 92, which routes the fuel to the second portion 73 of the feed injector 58. The second flow path 92 includes a first block valve 94, a second block valve 96, and a check valve 98.

Next, a cleaning fluid flow path 108 is coupled to the first flow path 100, second flow path 92, and high pressure recirculation flow path 82. Specifically, the cleaning fluid flow path 108 routes a cleaning fluid 110 through a check valve 112, a first block valve 116, a second block valve 114, and a third block valve 118. In certain embodiments, check valves may be located downstream of valves 114, 116, and 118. Examples of the cleaning fluid 110 include, but are not limited to, water, condensate, boiler feedwater, and so forth. Similarly, a purge gas flow path 120 routes a purge gas 122 to the first flow path 100 and the second flow path 92 through a check valve 124, a first block valve 128, and a second block valve 126. In certain embodiments, check valves may be located downstream of valves 126 and 128. Examples of the purge gas 122 include, but are not limited to, nitrogen, carbon dioxide, and so forth. In certain embodiments, a flush line 130 may be coupled to the high pressure recirculation flow path 82. The flush line 130 may be used to route material to a sump 132 through a flush valve 134. In addition, certain embodiments of the fuel circulation system 56 may include a controller 136, which may send and/or receive signals 138 to the various valves and pumps of the fuel circulation system 56. Further, the controller 136 may receive signals 138 from various sensors disposed in the fuel circulation system 56, such as sensors 135, which may provide information regarding, for example, pressure, temperature, flow rate, and/or composition.

In an alternative embodiment, the low flow rate portion 69 may be supplied by a first fuel circulation system 137 and the high flow rate portion 73 may be supplied by a second fuel circulation system 139. The first and second fuel circulation systems 137 and 139 may each include separate components similar to those shown for the fuel circulation system 56, such as separate fuel booster pumps 80, fuel storage tanks 74, recirculation flow paths 78, and fuel circulation pumps 76. Thus, in such embodiments, the fuel circulation system 56 includes the first fuel circulation system 137 and the second fuel circulation system 139, wherein the flow rates of fuel 12 to the feed injector 58 are controlled by separately adjusting the speeds of the two fuel booster pumps 80 of the first and second fuel circulation systems 137 and 139. In other words, one shared recirculation flow path 82 is not used to supply both the low flow rate portion 69 and the high flow rate portion 73.

In still another alternative embodiment, valves similar to the recirculation backpressure valve 88, such as valves 131 and 133, may be disposed upstream or downstream of each of the second block valves 104 and 96 to help regulate the flow of fuel 12 to the low flow rate portion 69 and the high flow rate portion 73, respectively.

Figure 3:
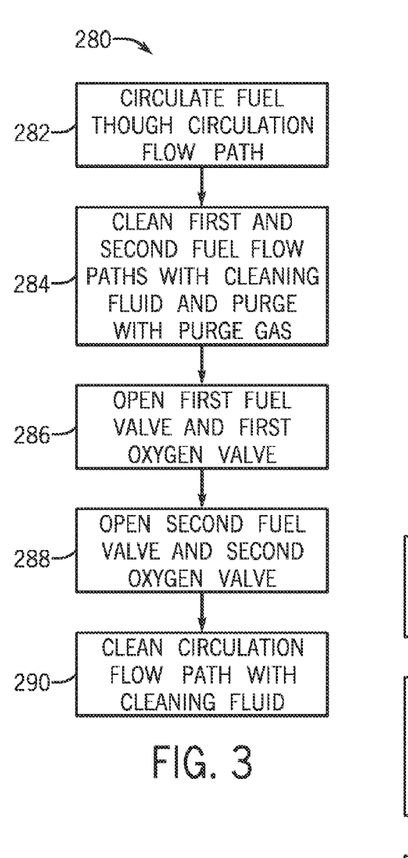
FIG. 3 is a flowchart of a process for supplying fuel to an embodiment of a feed injector.

FIG. 3 shows a flow chart of a process 280 that may be used to operate the fuel circulation system 56. In a first step 282, the fuel 12 may be circulated through the high pressure recirculation flow path 82 using the fuel booster pump 80. Specifically, the first recirculation block valve 84, the second recirculation block valve 86, and the return valve 90 are open to enable the fuel 12 flow to and from the fuel storage tank 74. In addition, the recirculation backpressure valve 88 may be at least one of partially or 100% open to enable the fuel 12 to flow through the high pressure recirculation flow path 82 while maintaining sufficient backpressure on the system as may be needed for control. The first block valves 102 and 94 are closed to help prevent the fuel from entering the first and second flow paths 100 and 92. In addition, the flush valve 134, the first and second block valves 128 and 126 of the purge gas flow path 120, and the third block valve 118 of the cleaning fluid flow path 108 may be closed. Furthermore, the fuel 12 may already be circulating through the low pressure recirculation flow path 78 using the fuel circulation pump 76 prior to the first step 282. Circulation of the fuel 12 may help prevent stagnation of the fuel 12, which may cause plugging in the fuel circulation system 56.

Next, in a second step 284, the first and second flow paths 100 and 92 may be cleaned and purged. Specifically, the cleaning fluid 110 may be introduced into the first and second flow paths 100 and 92 by opening first and second block valves 116 and 114, respectively. In addition, second block valves 96 and 104 are opened to enable the cleaning fluid 110 to at least partially flush the first and second flow paths 100 and 92 into the feed injector 58. The check valve 112 helps to prevent backflow of fuel 12 into the cleaning fluid 110. In certain embodiments, several check valves may be used to prevent backflow of fuel 12.

Next, the purge gas 122 may flow through the purge gas flow path 120 to help purge, or remove, the cleaning fluid 110 from the first and second flow paths 100 and 92. Specifically, the purge gas 122 may be introduced into the first and second flow paths 100 and 92 by opening first and second block valves 128 and 126, respectively. In addition, the second block valves 96 and 104 are closed to provide double valve and buffer isolations between the high pressure recirculation flow path 82 and the feed injector 58. In other words, both the first and second flow paths 100 and 92 are separated from the feed injector by two valves (e.g., first and second block valves 102 and 104 for the first flow path 100 and first and second block valves 94 and 96 for the second flow path 92) and a buffer of cleaning fluid 110 located between the two valves. In addition, the supply pressure of the cleaning fluid 110 may be higher than a maximum attainable supply pressure of the fuel 12. Thus, if any of the valves 94, 96, 102, or 104 leaks, the fuel 12 will be less likely to enter the space between the double valves. Such a double valve and buffer isolation may provide for reliable separation between the fuel circulation system 56 and the feed injector 58. In addition, when using the double valve and buffer arrangements for isolation, the upstream valves (e.g., valves 102 or 94) may close first, the downstream valves (e.g., valves 104 or 96) may close second, and the cleaning fluid valves (e.g., valves 116 or 114) may open last. The check valves 106 and 98 also help to prevent backflow from the feed injector 58 into the first and second flow paths 100 and 92, respectively. In addition, the check valve 124 helps to prevent backflow of cleaning fluid 110 into the purge gas 122. In certain embodiments, several check valves may be used to prevent backflow of cleaning fluid 110. In an alternative embodiment, a buffer of the cleaning fluid 110 may be established before starting the flow of fuel 12. Specifically, with second block valves 96 and 104 closed, the flow of the cleaning fluid 110 may be started along the high pressure recirculation flow path 82 to the sump flow path 130 and the sump 132. Then, first block valves 94 and 102 may be closed. Using this embodiment helps prevent or minimize the amount of cleaning fluid 110 that flows into the gasifier 16. In still further embodiments, step 284 is performed without the cleaning portion of step 284 described above (i.e., the first and second flow paths 100 and 92 may only be purged).

In a third step 286, the fuel 12 and oxygen 14 are supplied to the first portion 69 of the feed injector 58. First, the fuel 12 may be introduced into the first flow path 100. Specifically, the first and second block valves 102 and 104 are opened to direct the fuel 12 into the feed injector 58. In addition, the first block valves 116 and 128 may be closed to stop the flow of cleaning fluid 110 and purge gas 122 into the first flow path 100. Further, the backpressure valve 88 may be closed slightly or further adjusted to help direct a portion of the fuel 12 from the high pressure recirculation flow path 82 to the first flow path 100. For example, the backpressure valve 88 may be closed to between approximately 20% to 90%, 40% to 80%, or 50% to 70%. In other words, the backpressure valve 88 may be used to adjust a ratio of a flow rate of the fuel 12 flowing through the high pressure recirculation flow path 82 to a flow rate of the fuel 12 flowing through the first flow path 100. In other embodiments, the backpressure valve 88 may be used to adjust a ratio of a flow rate of the fuel 12 flowing through the first flow path 100 to a flow rate of the fuel 12 flowing through the second flow path 92. Flow rates may be determined using flow meters or similar devices. In addition, the controller 136 may send signals 138 to flow controls, such as valves, to introduce the oxygen 14 to the first and third passages 64 and 68 of the feed injector 58 just after the fuel 12 reaches the downstream side 62 of the feed injector 58. Thus, the feed injector 58 may operate using the first portion 69 of the feed injector 58 at the low flow rate. For example, the low flow fuel rate may be between approximately 10% to 110%, 30% to 100%, or 50% to 100% of the normal flow rate of first portion 69. In addition, because of heat loss effects, an oxygen to fuel ratio required to maintain the gasifier temperature may be much higher at very low throughputs compared to high throughput operation. Conversely, the amount of temperature moderator introduced with the fuel and oxygen feeds may be much lower at very low throughputs compared to high throughput operation. Thus, the controller 136 also may be used to decrease the oxygen to fuel ratio and/or increase the moderator feed rate with throughput increases in order to maintain the gasifier 16 temperature in the desired range. In other words, the controller 136 may be used to adjust the oxygen to fuel ratio and/or moderator feed rate throughout the process 280 to maintain the gasifier 16 temperature in the desired range.

Also, during the third step 286, the second flow path 92 may continue to be purged with the purge gas 122. Specifically, both the fourth and fifth passages 70 and 72 of the high flow rate portion 73 of the feed injector 58 may be purged with the purge gas 122. In certain embodiments, the supply pressure of the purge gas 122 may be higher than a maximum achievable pressure within the gasifier 16 to help prevent backflow of material from the gasifier 16 into the supply of the purge gas 122. Furthermore, the rate of flow of purge gas 122 may be at different rates during operation of the first portion 69 compared to during or following cleaning.

In a fourth step 288, the fuel 12 and oxygen 14 are supplied to the second portion 73 of the feed injector 58. First, the fuel 12 may be introduced into the second flow path 92. Specifically, the first and second block valves 94 and 96 are opened to direct the fuel 12 into the feed injector 58. In addition, the second block valves 114 and 126 may be closed to stop the flow of cleaning fluid 110 and purge gas 122 into the second flow path 92. Further, the backpressure valve 88 may be closed to help direct the fuel 12 from the fuel booster pump 80 to both the first and second flow paths 100 and 92. In some embodiments, the backpressure valve 88 may be left slightly open to maintain some circulation of the fuel 12 through the high pressure recirculation flow path 82. In addition, the closure of the backpressure valve 88 may be performed by the controller 136 slowly to gradually increase a flow rate of the fuel 12 through the second flow path 92 and the feed injector 58. At the higher flowrates of the fourth step 288, the oxygen to fuel ratio required to maintain the gasifier temperature may be lower compared to low throughput operation (depending on the amount of change in flowrate).

In general, operation of second portion 73 may create an effective step change in the throughput of gasifier 16. However, the rate of increase of the flow rate of the fuel 12 through the second flow path 92 may be limited to help prevent snuffing out of the flame (i.e., reaction zone) of the first portion 69 of the feed injector 58. In addition, the controller 136 may send signals 138 to flow controls, such as valves, to introduce the oxygen 14 to the fifth passage 72 of the feed injector 58 just after the fuel 12 reaches the downstream side 62 of the second portion 73 of the feed injector 58. The controller 136 may also limit the rate of increase of the flow rate of the oxygen 14 to correspond with the increase in the flow rate of the fuel 12 through the second flow path 92 while incorporating an offset to decrease the oxygen to fuel ratio so that the gasifier temperature 16 may be maintained within the desired limits. Additionally, the controller 136 may increase the rate of temperature moderator while also adjusting the oxygen to fuel ratio or instead of adjusting the oxygen to fuel ratio with the corresponding increases in the total throughput of fuel through gasifier 16 associated with the operation of first portion 69 and second portions 73. Thus, the feed injector 58 may operate using both the first and second portions 69 and 73 of the feed injector 58 at the normal flow rate. In some embodiments, the first portion 69 may be shut off and purged with the purge gas 122 (e.g., a continuous purge) while the second portion 73 is used. In other embodiments, only selected passages of the first portion 69 are shut off and purged with the purge gas 122.

In a fifth step 290, a portion of the high pressure recirculation flow path 82 not currently used to flow the fuel 12 to the feed injector 58 may be cleaned with the cleaning fluid 110. Specifically, the first recirculation block valve 84 may be closed to isolate the high pressure recirculation flow path 82 from the first and second flow paths 100 and 92. In addition, the recirculation backpressure valve 88 may be completely opened. Further, the return valve 90 may be closed to help prevent the cleaning fluid 110 from entering the fuel storage tank 74 and the flush valve 134 may be opened to direct the fuel 12 and cleaning fluid 110 to the sump 132 along the sump flow path 130. At this point, the third block valve 118 may be opened to direct the cleaning fluid 110 to the circulation path 82. The first and second block valves 116 and 114 are already closed. Any potential settling and plugging of the fuel 12 may be avoided by removing the fuel 12 from the portion of the high pressure recirculation flow path 82 not used to flow the fuel 12 to the feed injector 58. After purging is complete, the second recirculation block valve 86 may be closed and the third block valve 118 remains open to provide a double valve and buffer isolation. In addition, the backpressure valve 88 may be closed.

In an alternative embodiment, the cleaning fluid portion of step 284 is performed before step 282, where block valves 104 and 96 are closed and the cleaning fluid is routed through block valves 102 and 94, and through valves 86, 88, and 134 to sump 132. The flow of the cleaning fluid 110 is maintained for a sufficient period to establish cleaning fluid buffers between valves 102 and 104 and valves 94 and 96, including the time needed for valves 102 and 94 to close. In addition, at least one isolation valve is used upstream of the branch in the piping upstream of block valves 102 and 94 to help minimize the flow of the cleaning fluid 110 to the discharge side of booster pump 80 while establishing the buffers. This is followed by step 282, then the purge portion of step 284, and then steps 286, 288, and 290.

Figure 4:
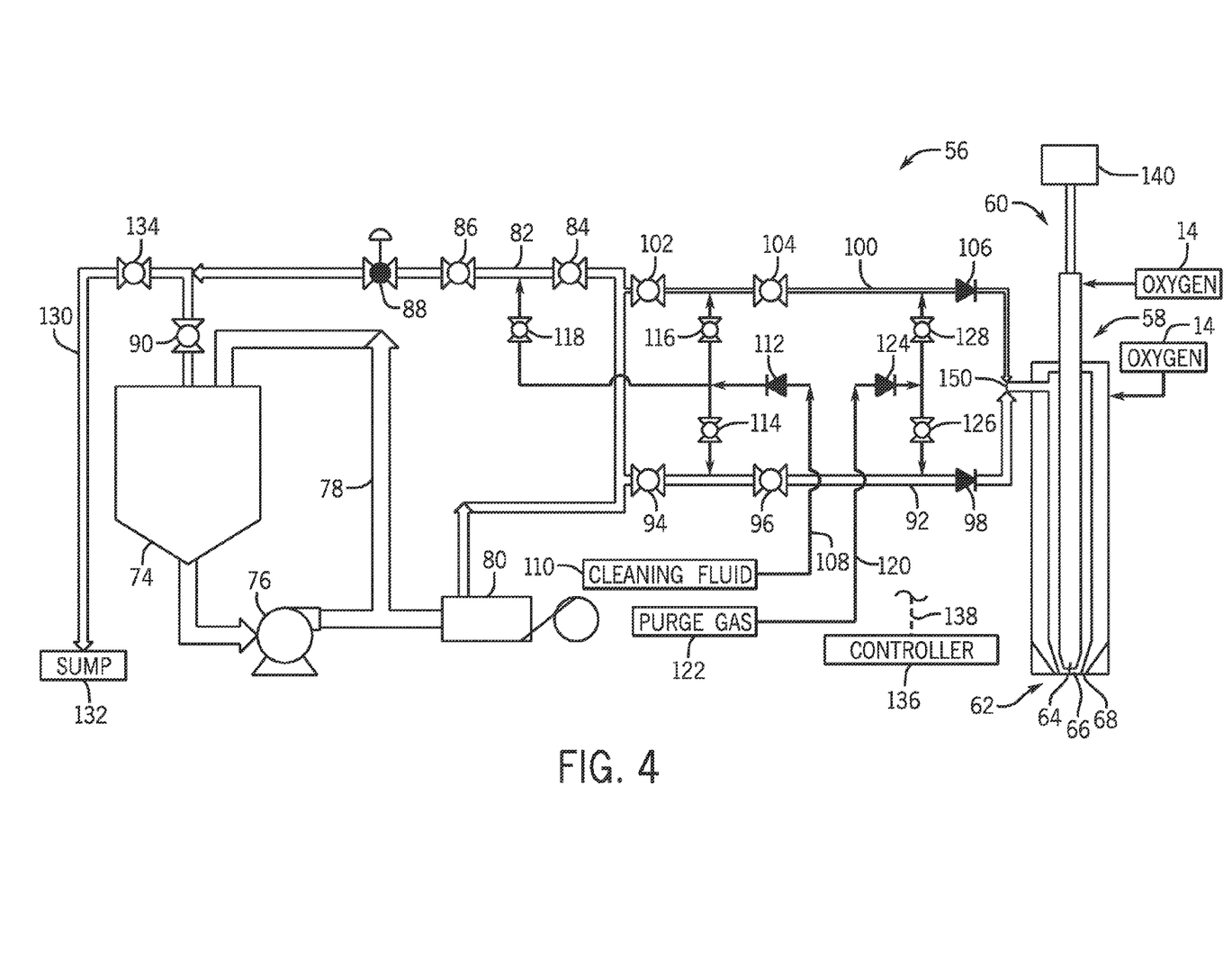
FIG. 4 is a block diagram of a gasification feed injector feed system according to an embodiment.

FIG. 4 is a block diagram of another embodiment of the fuel circulation system 56 that may be used with the process 280. In the illustrated embodiment, the feed injector 58 includes fewer passages. Specifically, the feed injector 58 includes the first passage 64, the second passage 66, and the third passage 68. The first passage 64 and the third passage 68 may route the oxygen 14 to the downstream side 62, while the second passage 66 may route the fuel 12 to the downstream side 62. The first passage 64 may be moved in an axial direction with respect to the feed injector 58. For example, the controller 136 may send a signal 138 to an actuator 140, or similar mechanism, to move the first passage 64 axially. Thus, the first passage 64 may be moved toward the downstream side 62 to reduce the aperture, or opening, of the second passage 66, thereby reducing the flow rate of the fuel 12. Moving the first passage 64 away from the downstream side 62 increases the aperture of the second passage 66, thereby increasing the flow rate of the fuel 12. Thus, axial adjustment of the first passage 64 may be used to switch the feed injector 58 between low flow rate (e.g., first passage 64 lowered) and high flow rate (e.g., first passage 64 raised) modes. For example, the flow rate of the low flow rate mode may be between approximately 10% to 110%, 30% to 100%, or 50% to 100% of the flow rate of the low flow rate mode normal operating condition. As such, in certain embodiments, the first flow path 100 and the second flow path 92 may not be routed to separate fuel passages of the feed injector 58. Instead the first and second flow paths 100 and 92 may join together at a connection 150 upstream of the feed injector 58.

In other embodiments, the first passage 64 may be moved to adjust the velocity of the fuel 12 rather than adjust the flow rate of the fuel 12, which may result in less movement of the first passage 64, thereby reducing tip wear. In such embodiments, valves upstream of the feed injector 58, such as valves 131 and 133 shown in FIG. 2, may be used to adjust the flow rate of the fuel 12 and other fluids flowing through the feed injector 58. These additional valves may operate cooperatively with the recirculation backpressure valve 88 to adjust a ratio of the fuel 12 between the gasifier 16 and the fuel storage tank 74 during the initial low throughput operation. Then, valve 88 may be closed and the additional valves fully opened as the flow rate of the fuel 12 is increased, eventually using a speed controller for the fuel booster pump 80 to provide the final flow rate of fuel 12. Although the low rate operation may be used for standby operations, in certain embodiments, the low flow rate operation may be limited to startup only because the long term integrity of valve 88 and the additional valves may be less of an issue. In addition, when operating in the turndown mode, the fuel booster pump 80 may be operated at its nominal low throughput (e.g., 50% of a normal operating condition) so that the need to use valves to control the flow of the fuel 12 is reduced. Such low flow rate operation may apply to the fuel circulation system 56 shown in FIG. 2 as well. In other embodiments, one or more of the passages of the feed injector 58 may be adjustable. Other aspects of the fuel circulation system 56 shown in FIG. 4 are similar to those described above with respect to FIG. 2.

Figure 5:
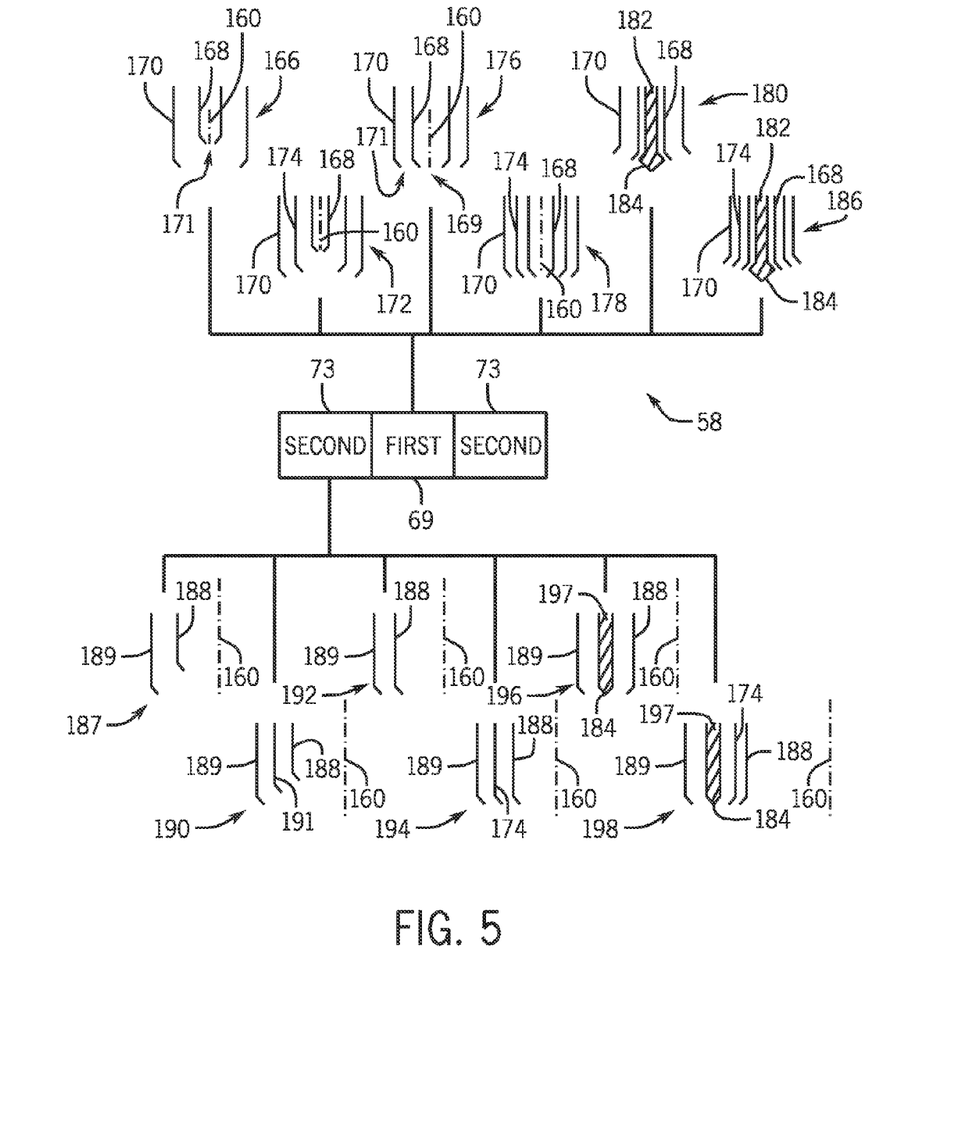
FIG. 5 is an exploded schematic of various embodiments of inner and outer portions of a feed injector.

FIG. 5 is an exploded view of various cross-sectional views of embodiments of the first and second portions 69 and 73 of the feed injector 58. As shown in FIG. 5, the various passages of the first and second portions 69 and 73 are concentric with one another about an axis 160 of the feed injector 58. Thus, the passages may be circular or annular passages, or any shape that facilitates operation of the gasifier system as described herein. In a first embodiment 166, the first portion 69 includes an inner passage 168 and an outer passage 170. For example, the inner passage 168 may be used to flow the oxygen 14 and the outer passage 170 may be used to flow the fuel 12. As shown in FIG. 5, the inner passage 168 may be recessed away from a tip 171 of the outer passage 170 to provide for additional mixing of the fuel 12 and oxygen 14. A second embodiment 172 includes the inner passage 168, the outer passage 170, and a middle passage 174. In certain embodiments, the inner and outer passages 168 and 170 may be used to flow the oxygen 14 and the middle passage 174 may be used to flow the fuel 12. As shown in FIG. 5, the tips of the passages 168 and 174 may be recessed in a staggered arrangement to improve the mixing of the fuel 12 and oxygen 14. In a third embodiment 176, a tip 169 of the inner passage 168 is flush with the tip 171 of the outer passage 170. Similarly, in a fourth embodiment 178, tips of the inner, middle, and outer passages 168, 174, and 170 are all flush with one another. The third and fourth embodiments 176 and 178 may be used where additional mixing of the fuel 12 and oxygen 14 is not needed. A fifth embodiment 180 includes a center body 182, which may be disposed within the inner passage 168 and used to disperse the material flowing through the inner passage 168 into a diverging spray pattern concentrically aligned at a tip 184 of the center body 182. Such an arrangement of the first portion 69 may provide for enhanced mixing between the fuel 12 and oxygen 14 flowing through the first and second portions 69 and 73. Specifically, the material flowing around the center body 182 may emerge in a diverging spray pattern (e.g., diverging conical spray), which interacts vigorously with the material emerging in a converging spray pattern from the tips of the passages in the second portion 73. Similarly, a sixth embodiment 186 includes the center body 182, and the inner, middle, and outer passages 168, 174, and 170.

The various embodiments of the first portion 69 may be combined with one or more of the embodiments of the second portion 73 shown in FIG. 5. For simplicity, only half of the cross-sectional views of the embodiments of the second portion 73 are shown in FIG. 5. In other words, FIG. 5 shows the half of the cross-sectional view to the left of the axis 160. The second portion 73 is arranged concentrically about the first portion 69. A first embodiment 187 of the second portion 73 includes an inner passage 188 and an outer passage 189. Thus, the first embodiment 187 may be used to flow two streams separately through the second portion 73. A second embodiment 190 includes the inner passage 188, the outer passage 189, and a middle passage 191. Thus, the second embodiment 190 may flow three streams separately through the second portion 73. As shown in FIG. 5, the first and second embodiments 187 and 190 include a staggered arrangement of the tips of the passages to help improve mixing. A third embodiment 192 includes the inner and outer passages 188 and 189 with tips flush with one another. Similarly, the fourth embodiment 194 includes the inner, middle, and outer passages 188, 191, and 189 with flush tips. The third and fourth embodiments 192 and 194 may be used where additional mixing of the material flowing through the second portion 73 is not needed. A fifth embodiment 196 includes a dividing wall 197 and the inner and outer passages 188 and 189. Thus, the dividing wall 197 of the fifth embodiment 196 may be used to provide a diverging spray pattern. Similarly, a sixth embodiment 198 includes the dividing wall 197, and inner, middle, and outer passages 188, 191, and 189.

Figure 6:
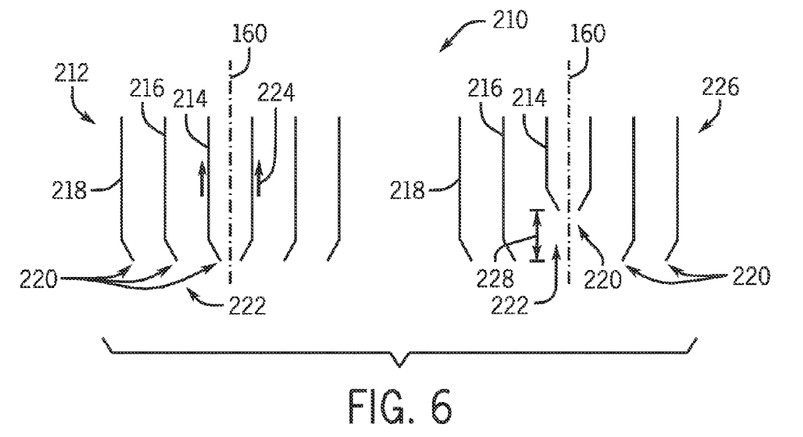
FIG. 6 is an axial cross-section of an embodiment of an adjustable feed injector.

FIG. 6 illustrates two cross-sectional views of an embodiment of an adjustable feed injector 210. Specifically, the adjustable feed injector 210 is shown in a low flow rate position 212 on the left side of FIG. 6. The adjustable feed injector 210 includes inner, middle, and outer passages 214, 216, and 218, which are all concentric with one another about the axis 160. Thus, the inner passage 214 may be a circular passage, and middle and outer passages 216, and 218 may be annular passages. As shown on the left side of FIG. 6, tips 220 of the passages 214, 216, and 218 are all flush with one another. As such, the size of an opening 222 through which material flows out of the middle passage 216 is at least somewhat limited by the inner passage 214. The inner passage 214 may be moved in an axial direction away from the tip 220 as indicated by arrows 224 to enable the flow rate of the material flowing through the middle passage 216 to increase. On the right side of FIG. 6, the adjustable feed injector 210 is shown in a high flow rate configuration 226. As shown in FIG. 6, the tip 220 of the inner passage 214 is located a distance 228 away from the tips 220 of the middle and outer passages 216 and 218. Thus, the material flowing through the middle passage 216 may flow at a higher flow rate because of the larger opening 222 now made available by moving the inner passage 214. Thus, the adjustable feed injector 210 may be used to provide for both low and high flow rate configurations during operation of the gasifier 16.

Figure 7:
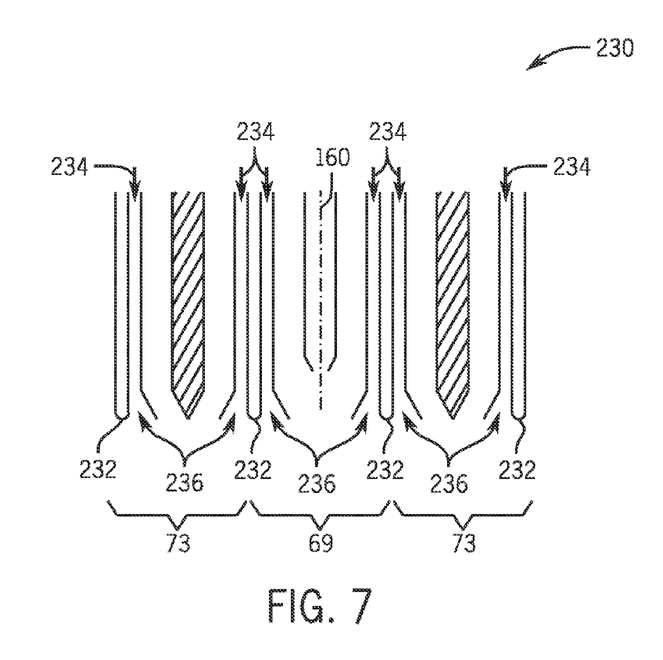
FIG. 7 is an axial cross-section of an embodiment of a feed injector with cooling tips and purge gas passages.

FIG. 7 is an axial cross-sectional view of a feed injector 230 with cooling tips and purge passages arranged concentrically about the axis 160. Specifically, cooling tips 232, or cooling conduits, are disposed between the first and second portions 69 and 73, and the cooling tips 232 may have an annular structure. The cooling tips 232 may be referred to as a third portion of the feed injector 230. In certain embodiments, the cooling tips 232 may also be disposed outside the second portion 73. Thus, both the first and second portions 69 and 73 are provided with the cooling tips 232. A cooling fluid (e.g., water) may circulate through the cooling tips 232 to help cool the feed injector 230. In addition, in certain embodiments, a purge gas 234 may flow through dedicated purge passages 236 that may surround both the first and second portions 69 and 73. The purge passages 236 may be referred to as a fourth portion of the feed injector 230. In certain embodiments, the purge passages 236 may be annular passages. The purge passages 236 may be used when either first or second portion 69 or 73 are not in use. For example, during startup, the first portion 69 may be used without the second portion 73. Thus, the purge gas 234 may flow through the purge passages 236 of the second portion 73 to help prevent buildup of deposits on the tips of the second portion 73. The purge passages 236 may be used intermittently or continuously during operation of the gasifier 16. Furthermore, the purge gas 234 may be used to purge the non-operating process flow passages of first portion 69 or second portion 73 that are not in use. Examples of the purge gas 234 include, but are not limited to, nitrogen, carbon dioxide, steam, and similar gases.

Figure 8:
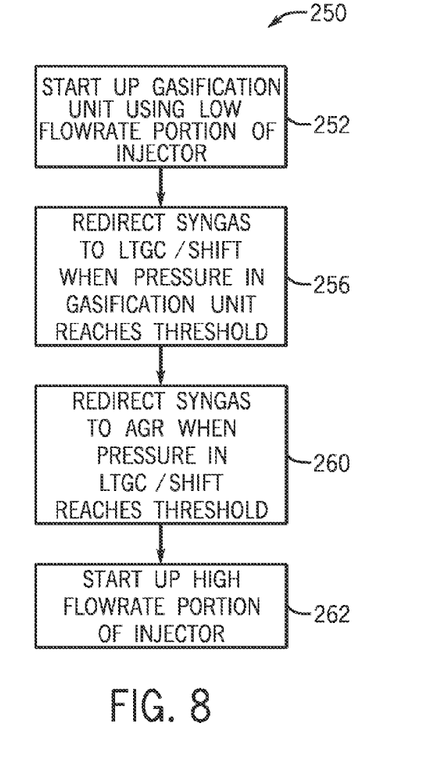
FIG. 8 is a flowchart of a process for operating low and high flow rate portions of an embodiment of a feed injector.

FIG. 8 is a flow chart of a method 250 that may be used to start up the gasifier 16 using the feed injection system 56 described in detail above. In a first step 252, the gasification unit, which for the exemplary embodiment includes the gasifier 16, high temperature heat recovery 18, quench 20, slag removal 22, syngas scrubbing 26, and fines removal 28, is started up using the first, or low flow rate, portion 69 of the feed injector 58. Alternatively, the first passage 64 of the adjustable feed injector 210 may be adjusted to flow a low flow rate of the fuel 12. The untreated syngas produced is used to pressurize the gasification unit, while also venting untreated syngas to the flare 42, as needed. In a second step 256, the untreated syngas from the syngas scrubbing system 26 is redirected to the LTGC/shift system 32 when a pressure in the gasification unit, such as in the syngas scrubbing system 26, reaches a first threshold, and excess untreated syngas is sent to the flare 42 after passing through LTGC/shift system 32. For example, in the case where the LTGC/shift system 32 is not receiving untreated syngas from another gasification train, the first threshold may be between approximately 25% to 100%, 60% to 90%, or 70 to 85% of a normal pressure but no lower than the actual pressure of the LTGC/shift system 32. As the gasifier 16 has been using the first portion 69 of the feed injector 58 during this time, emissions from the flare 42 may be maintained at a low level. In a third step 260, the output from the LTGC/shift system 32 is redirected from the flare 42 to the acid gas removal system 34 and downstream users 38 when a pressure in the LTGC/shift system 32 reaches a second threshold. For example, in the case where the acid gas removal system 34 is not receiving untreated gas from another gasification train, the second threshold may be between approximately 50% to 100%, 60% to 90%, or 70 to 85% of a normal pressure but no lower than the actual pressure of the acid gas removal system 34. Emissions from the flare 42 are now maintained at a lower level both because gasifier 16 is using the first portion 69 of the feed injector 58, and now treated gas may be routed to the flare 42 from the acid gas removal system 34 instead of untreated gas. In a fourth step 262, the second portion 73 of the feed injector 58 is used. Use of the first portion 69 may be stopped at this point or continued. Finally, once the pressure in the acid gas removal system 34 reaches a third threshold pressure, the treated syngas may be routed to downstream users 38, such as to a gas turbine in the IGCC power plant 10, after which rates may gradually be increased to the normal operating conditions as discussed in detail below. In other embodiments, method 250 may include additional or fewer steps than those shown in FIG. 8. In addition, the steps of the method 250 may be performed in a different order in certain embodiments, or the first and second threshold pressures may be variable or the same. For example, if a downstream system, including, but not limited to, either the LTGC/shift system 32 or the acid gas removal system 34, is receiving syngas from an already operating gasification train, then the syngas from the gasification unit starting up at the low flow rate may be combined with and routed to the same location as the syngas from the already operating gasification train. Furthermore, the threshold pressure for the gasification unit starting up may be substantially equal to the pressure in the downstream system. Alternatively, if a downstream system is receiving syngas from an already operating gasification train or a downstream system may be particularly sensitive to any unsteady conditions associated with increasing the throughput using the high flow rate portion 73, the throughput of the gasification unit may be increased using the high flow rate portion 73 prior to redirecting the syngas from the gasification unit starting up into the downstream system. In other words, the gasification unit may be started up using the low flow rate portion 69, merged into downstream equipment, and then switched to using the high flow rate portion 73. Alternatively, the gasification unit may be started up using the low flow rate portion 69, switched to using the high flow rate portion 73, and then merged into downstream equipment. Switching to using the high flow rate portion 73 before merging into downstream equipment may help prevent any sudden pressure or flow surge from propagating into other operating gasification trains or downstream systems.

Figure 9:
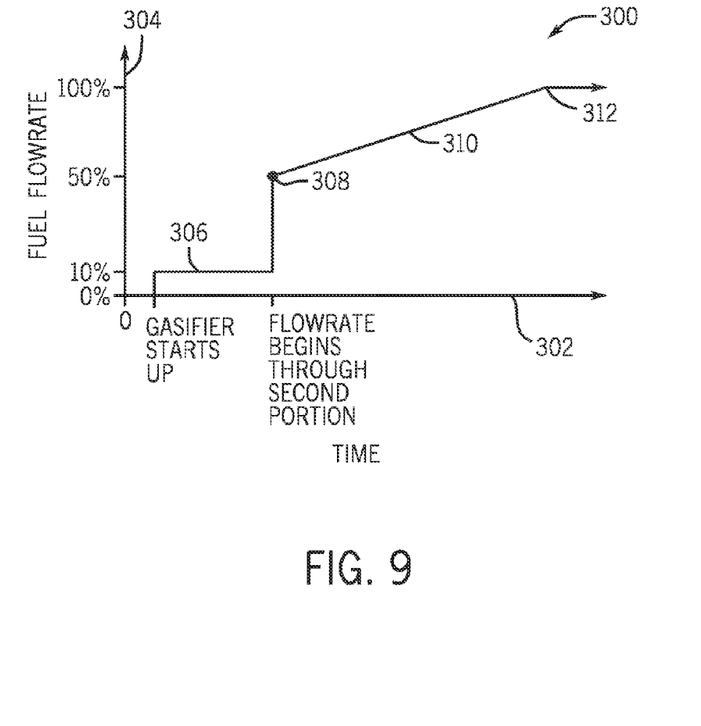
FIG. 9 is a graph of a fuel flow rate during startup of an embodiment of a feed injector.

FIG. 9 shows a graph 300 of the flow rate of the fuel 12 versus time for startup and operation of the gasifier 16. Specifically, time 302 is shown on the x-axis and a fuel flow rate 304 is shown on the y-axis of the graph 300. As discussed above, the gasifier 16 may be started using just the first portion 69 of the feed injector 58. This low flow rate operation is represented on the graph 300 by line 306. As shown in graph 300, line 306 describes a startup flow rate of fuel 12 at a substantially constant flow rate, such as 10%. At the point in time labeled "flow rate through second portion begins" in FIG. 9, the feed injector 58 transitions to a new operating point 308 using the second portion 73, and the flow rate undergoes a step increase in rate to approximately 50%. In certain embodiments, the operating point 308 may be between approximately 12% to 100%, 15% to 75%, or 20% to 60%. Finally, the flow rate transitions to the normal operating condition as represented by line 310. Specifically, the normal operating condition is represented by horizontal line 312. In various embodiments, the slopes of the lines 306 and 310 and the positions of operating point 308 and normal operating condition 312 may be different from those shown in graph 300. In addition, the lines 306 and 310 may be linear, curved, stepped, and so forth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a single gasification feed injector, comprising:
  a first injector portion configured to inject a first fuel at a first flow rate into a gasifier;
  a second injector portion configured to inject a second fuel at a second flow rate into the gasifier, wherein the first injector portion and the second injector portion are concentrically arranged around a longitudinal axis of the single gasification feed injector; and
  an actuator coupled to the first injector portion or the second injection portion, wherein the actuator is configured to move the first injector portion or the second portion in an axial direction to adjust the first flow rate or the second flow rate, respectively;
 a fuel circulation system configured to circulate at least one fuel and supply the at least one fuel to the single gasification feed injector; and
 a controller programmed to transition the single gasification feed injector from injecting the first fuel to injecting the second fuel based at least on a pressure downstream of the single gasification feed injector.

2. The system of claim 1, wherein the first flow rate is less than the second flow rate.

3. The system of claim 2, wherein the first flow rate is less than approximately 100 percent of the second flow rate.

4. The system of claim 1, wherein the first and second injector portions each comprise at least one fuel conduit configured to inject the respective first or second fuel and at least one oxygen conduit configured to inject oxygen.

5. The system of claim 1, wherein the first and second injector portions each comprise at least two concentric conduits disposed about the longitudinal axis.

6. The system of claim 1, wherein the first and second injector portions each comprise at least three concentric conduits disposed about the longitudinal axis.

7. The system of claim 1, wherein the single gasification feed injector is configured to inject a continuous purge gas through the first or second injector portion when either the first or second injector portion is not in operation.

8. The system of claim 1, wherein the controller is programmed to transition the single gasification feed injector from injecting the first fuel to injecting the second fuel when the pressure exceeds a threshold.

9. The system of claim 1, comprising a third injector portion configured to circulate a coolant through a cooling conduit.

10. The system of claim 9, comprising a fourth injector portion configured to inject a continuous purge gas through a dedicated purge gas passage.

11. The system of claim 1, wherein the fuel circulation system comprises at least one pump configured to circulate the at least one fuel and a fuel flow path configured to supply the at least one fuel to the single gasification feed injector.

12. The system of claim 1, wherein the fuel circulation system comprises a first pump configured to circulate the first fuel, a first fuel flow path configured to supply the first fuel to the single gasification feed injector, a second pump configured to circulate the second fuel, and a second fuel flow path configured to supply the second fuel to the single gasification feed injector.

13. The system of claim 1, wherein the controller is programmed to adjust an oxygen to fuel ratio or a moderator flowrate to control a temperature of a gasifier having the single gasification feed injector.

14. The system of claim 1, comprising:
 a liquid fuel tank configured to store a liquid fuel;
 a first flow path configured to supply the liquid fuel from the liquid fuel tank at a low flow rate to a low flow rate portion of the single gasification feed injector;
 a second flow path configured to supply the liquid fuel from the liquid fuel tank at a high flow rate to a high flow rate portion of the single gasification feed injector;
 a cleaning fluid flow path configured to route a cleaning fluid to the first and second flow paths to selectively clean the first and second flow paths; and
 a purge gas flow path configured to route a purge gas to the first and second flow paths to selectively purge the first and second flow paths.

15. The system of claim 14, comprising:
 at least one booster pump configured to transfer the liquid fuel from the liquid fuel tank to at least one of the first flow path and second flow path;
 a liquid fuel circulation pump configured to circulate the liquid fuel;
 a recirculation flow path configured to route the liquid fuel from the liquid fuel tank, to the liquid fuel circulation pump, to the first flow path, to the second flow path, and back to the liquid fuel tank;

a backpressure valve disposed in the recirculation flow path, wherein the backpressure valve is configured to adjust at least one of a ratio of a first flow rate of the liquid fuel flowing through the recirculation flow path to a second flow rate of the liquid fuel flowing through the first flow path or the second flow path, or a ratio of a third flow rate of the liquid fuel flowing through the first flow path to a fourth flow rate of the liquid fuel flowing through the second flow path; and at least one of the first flow path or the second flow path comprises a pump and a valve configured to at least partially control a flow rate of the liquid fuel.

16. The system of claim 1, comprising:

a control system having the controller, wherein the controller is programmed to:

start up a gasification unit to produce a syngas using a low flow rate portion of the single gasification feed injector to inject the first fuel at a low flow rate into the gasifier of the gasification unit;

redirect the syngas to a first unit of the gasification unit when a first pressure of the gasification unit reaches a first threshold;

redirect the syngas to a second unit of the gasification unit when a second pressure of the first unit of the gasification unit reaches a second threshold; and start up a high flow rate portion of the single gasification feed injector to inject the second fuel at a high flow rate into the gasifier to increase a flow rate of the syngas after the gasification unit pressure reaches at least one of the first or the second threshold.

17. The system of claim 16, wherein the control system is programmed to:

clean a first flow path with a cleaning fluid;

purge the first flow path with a purge gas; and open a first fuel valve to route the first fuel to the first flow path; or establish a buffer in the first fuel flow path with the cleaning fluid; and open the first fuel valve to route the first fuel to the first flow path when starting up the gasifier using the low flow rate portion of the single gasification feed injector.

18. The system of claim 16, wherein the control system is programmed to:

clean a second flow path with a cleaning fluid;

purge the second flow path with a purge gas; and open a second fuel valve to route the second fuel to the second flow path; or establish a buffer in the second fuel flow path with the cleaning fluid; and open the second fuel valve to route the second fuel to the second flow path when starting up the high flow rate portion of the single gasification feed injector.

19. The system of claim 1, wherein the first injector portion comprises an inner passage having a first tip and an outer passage having a second tip, and the first tip is recessed away from the second tip along the longitudinal axis of the single gasification feed injector.

20. The system of claim 1, wherein the first injector portion comprises an inner passage having a first tip and an outer passage having a second tip, wherein the first and second tips are aligned at a location along the longitudinal axis of the single gasification feed injector.

21. The system of claim 1, wherein the single gasification feed injector comprises an inner passage and a center body, disposed within the inner passage, and the inner passage and the center body are concentrically aligned with respect to each other and are programmed to disperse a first fuel in a divergent spray pattern.

22. The system of claim 1, wherein the single gasification feed injector comprises cooling tips disposed between the first injector portion and the second injector portion.

23. The system of claim 1, wherein the second injector portion comprises an inner passage having a first tip and an outer passage having a second tip, and the first tip is recessed away from the second tip along the longitudinal axis of the single gasification feed injector.

24. The system of claim 1, wherein the second injector portion comprises an inner passage having a first tip and an outer passage having a second tip, wherein the first and second tips are aligned at a location along the longitudinal axis of the single gasification feed injector.

25. The system of claim 1, wherein the single gasification feed injector comprises an inner passage and dividing wall, disposed within the inner passage, and the inner passage and the dividing wall are concentrically aligned with respect to each other and are configured to disperse a first fuel in a divergent spray pattern.

26. The system of claim 1, wherein the single gasification feed injector comprises cooling tips concentrically disposed around the longitudinal axis.

\* \* \* \* \*